(12) United States Patent
Hering et al.

(10) Patent No.: US 11,220,195 B2
(45) Date of Patent: Jan. 11, 2022

(54) EDGE STRIP FOR A SEAT COVER

(71) Applicant: ADIENT ENGINEERING AND IP GMBH, Burscheid (DE)

(72) Inventors: Michelle Hering, Dortmund (DE); Andreas Schmitz, Burscheid (DE); Lars Hennig, Leichlingen (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/967,299

(22) PCT Filed: Feb. 4, 2019

(86) PCT No.: PCT/EP2019/052641
§ 371 (c)(1),
(2) Date: Aug. 4, 2020

(87) PCT Pub. No.: WO2019/149933
PCT Pub. Date: Aug. 8, 2019

(65) Prior Publication Data
US 2021/0023971 A1    Jan. 28, 2021

(30) Foreign Application Priority Data
Feb. 5, 2018 (DE) .................... 10 2018 201 754.9

(51) Int. Cl.
*D05B 23/00* (2006.01)
*A47C 7/02* (2006.01)
*B60N 2/58* (2006.01)

(52) U.S. Cl.
CPC ......... *B60N 2/5883* (2013.01); *B60N 2/5891* (2013.01)

(58) Field of Classification Search
CPC .... A47C 27/05; A47C 27/053; B60N 2/5883; B60N 2/5825; B60N 2/5816; B60N 2/58;
(Continued)

(56) References Cited

U.S. PATENT DOCUMENTS 2,028,494 A    1/1936   Blanchet et al.
3,535,195 A *  10/1970  Loew .................... B68G 7/105
                                                    428/123
(Continued)

FOREIGN PATENT DOCUMENTS

DE            3927385      2/1991
DE        202005003613     3/2005
(Continued)

OTHER PUBLICATIONS

PCT International Search Report and Written Opinion (PCT/EP2019/052641).
(Continued)

*Primary Examiner* — Shin H Kim
(74) *Attorney, Agent, or Firm* — Marshall & Melhorn, LLC

(57) ABSTRACT

An edge strip for a seat cover may have an edge strip core, which is surrounded by a casing, and an edge strip tab. The edge strip core and the casing are sewn together such that an ornamental seam is formed on the outer circumference of the casing. A device for producing an edge strip is also disclosed. The device may have a supply unit for supplying an edge strip core and an unfolded material strip for a casing of the edge strip core to an additional processing unit, such as a sewing machine. The supply unit is designed to supply the edge strip core to the additional processing unit, such as a sewing machine, on a material strip surface side which forms the inner face of the casing, and the sewing machine sews the edge strip core to the material strip.

1 Claim, 9 Drawing Sheets

(58) Field of Classification Search
CPC ...... B60N 2/70; B60N 2/7005; B60N 2/5891; B60N 2/7011; B60N 2/6009; B60N 2/6018; B60N 2/6027; B68G 7/105
See application file for complete search history.

(56) References Cited

U.S. PATENT DOCUMENTS

| | | | | |
|---|---|---|---|---|
| 3,818,521 | A * | 6/1974 | Richards, Jr. | B68G 7/10 5/698 |
| 3,822,426 | A * | 7/1974 | Mistarz | A47C 27/05 5/717 |
| 3,940,812 | A * | 3/1976 | DiForti | A43B 9/00 112/418 |
| 4,650,251 | A * | 3/1987 | Shimada | A47C 31/00 156/73.1 |
| 5,382,398 | A * | 1/1995 | Draxlmaier, Jr. | B60R 13/02 112/470.27 |
| 5,893,579 | A * | 4/1999 | Kimura | B60R 21/207 280/730.2 |
| 6,845,725 | B2 * | 1/2005 | Takei | B60N 2/5883 112/470.27 |
| 7,278,363 | B2 * | 10/2007 | Wieczorek | B60N 2/5883 112/139 |
| 9,296,354 | B1 * | 3/2016 | Preisler | B60R 21/215 |
| 10,112,514 | B2 * | 10/2018 | Lemarchand | B60N 2/5883 |
| 10,220,741 | B2 * | 3/2019 | Sekino | B60N 2/5883 |
| 10,576,852 | B2 * | 3/2020 | Sasaki | B60N 2/70 |
| 10,981,477 | B2 * | 4/2021 | Ishii | B60N 2/5875 |
| 2002/0152939 | A1 * | 10/2002 | Ashton | D05B 31/00 112/441 |
| 2004/0154511 | A1 * | 8/2004 | Takei | D05B 93/00 112/475.17 |
| 2007/0014969 | A1 * | 1/2007 | Olley | B32B 3/06 428/104 |
| 2007/0022931 | A1 * | 2/2007 | Wieczorek | D05B 35/06 112/475.06 |
| 2009/0090285 | A1 * | 4/2009 | Dooley | B29C 66/45 112/470.27 |
| 2012/0001464 | A1 * | 1/2012 | Teoh | B60N 2/6018 297/218.1 |
| 2012/0279431 | A1 * | 11/2012 | Penisch | D05B 35/02 112/418 |
| 2015/0361605 | A1 * | 12/2015 | Nakata | D05B 1/20 112/475.16 |
| 2015/0375654 | A1 | 12/2015 | Lemarchand et al. | |
| 2021/0069944 | A1 * | 3/2021 | Eickens | B32B 5/245 |

FOREIGN PATENT DOCUMENTS

| | | |
|---|---|---|
| FR | 2334776 | 8/1977 |
| FR | 2888574 | 1/2019 |
| GB | 150098 | 12/1919 |
| JP | 58167115 | 10/1983 |
| KR | 101660302 | 9/2016 |

OTHER PUBLICATIONS

Nahtechnik & Produktionszubehor Zieger; YouTube video published May 26, 2015; pp. 1-2 (retrieved Feb. 21, 2019).

* cited by examiner

EDGE STRIP FOR A SEAT COVER

The invention relates to an edge strip for a seat cover, to a method for producing the edge strip, and to an apparatus for producing the edge strip, and to a seat cover for a seat, in particular a vehicle seat.

A seat, such as a vehicle seat, is usually provided with a seat cover. Moreover, it is known to provide the seat cover with a decoration or decorative seam in the form of an edge strip. An edge strip is understood to mean, in particular, an edge reinforcement between two cover parts, for example for a seat, a headrest, a floor mat, a vehicle headliner, a beam, a sun visor, a glove compartment or the like. Here, the edge strip serves both for edge reinforcement and as a decoration element. For example, the edge strip serves to emphasize contours or as a design element.

It is an object of the present invention to specify an improved edge strip, in particular an edge strip with an improved edge strip core holder with at the same time an improved visual effect. Furthermore, it is an object of the present invention to specify an improved method and an improved apparatus for producing an edge strip.

According to the invention, the object with regard to the edge strip, in particular for a seat cover, is solved by way of an edge strip which comprises an edge strip core, which is surrounded by a casing, and an edge strip tab, the edge strip core and the casing being sewn to one another in such a way that a decorative seam is formed on the outer circumference of the casing.

For example, the casing and the edge strip core are sewn to one another by means of a thread, for example made from plastic or from natural material. The thread forms the corresponding decorative seam on the outer circumference of the casing. In particular, the thread which forms the decorative seam is guided completely through the edge strip core, in particular is sewn through the edge strip core.

The advantages which can be achieved by way of the invention consist, in particular, in that an edge strip which is configured in this way with an edge strip core which is sewn to the casing brings about or makes both secure fixing of the edge strip core in the casing and a reinforcement of the seam junction of two cover parts and a visual effect by way of the decorative or decoration seam possible. Here, the casing of the edge strip serves to fasten the edge strip, for example, to a seat part, an upholstery part, a sun visor or another similar part.

The edge strip core (also called a bead, kernel or core) is enclosed or surrounded by the casing. Here, for example, the edge strip core lies loosely in the casing. In order to fix the edge strip core on the casing, said edge strip core is sewn by means of the decorative or decoration seam to the casing along the longitudinal extent of the latter. In addition, the edge strip core can be fastened to the casing, in particular its material strip, by means of an integrally joined connection. For example, the material strip can additionally be of self-adhesive configuration on the inner side. Here, a contact adhesive coating can be applied on an inner side of the casing or its material strip, which inner side faces the edge strip core. For example, the casing is formed from plastic, such as vinyl, or natural materials.

In one possible embodiment, free ends of the casing form the edge strip tab, the free ends being sewn to one another. In other words, the material strip encases the edge strip core, and is connected to the edge strip core, in particular is sewn centrally, and is additionally sewn to the free ends of the casing with the configuration of the edge strip tab. Here, the edge strip is sewn between two cover parts to be connected, for example for a seat cover or headrest cover.

In a further refinement of the edge strip, the casing is provided with a lining. For example, the lining is arranged on the casing after production of the latter, and forms an upper material to be sewn together with the casing. The lining is formed, for example, from plastic or a natural material. For example, the lining is a foam lining. A strength of the edge strip can be increased by way of a lining of this type. In particular, the edge strip is reinforced with respect to mechanical loading. In this refinement, the decorative seam, in particular the thread which forms the decorative seam, is guided through the casing, the lining and the edge strip core on a side which is not visible and lies opposite the outer circumference of the casing. Subsequently, the casing, in particular the free ends of the casing, is/are laid around the edge strip core, the free ends of the casing being sewn to one another.

In one possible embodiment, the edge strip core is formed from an elastic material, in particular from plastic or rubber. This makes pleasant seating comfort for a person seated on the seat cover possible. Furthermore, the casing or cover material is formed from plastic, for example from polypropylene, or a natural material. The casing material is, in particular, of more solid configuration than the material of the edge strip core.

The edge strip core is formed, for example, from a shaped part, in particular a plastic, foam or rubber cord. The casing is formed, for example, from a cover material, in particular from plastic, leather or a woven fabric.

In accordance with a further embodiment, the decorative seam extends centrally along the longitudinal extent of the edge strip on its upper side. As a result, the edge strip is enhanced visually and decorated.

The method according to the invention for producing an edge strip comprises the following steps:
  feeding of an edge strip core and an unfolded material strip of a casing for the edge strip core into a feed unit in such a way that the edge strip core is fed to another processing unit, in particular a sewing machine, on a surface side of the material strip, which surface side forms the inner side of the casing, and
  sewing of the edge strip core to the material strip by means of the sewing machine.

In one development of the method, the material strip which is sewn to the edge strip core is folded in such a way that the material strip encases the edge strip core, and free ends of the material strip which are sewn to one another form the edge strip tab. In particular, the free ends are sewn to one another on the side which faces the edge strip core. As a result, the edge strip core is held securely in the casing, in particular in a cavity of the casing, which cavity is formed by way of the fold.

Moreover, the feed unit is set up, for example, in such a way that the edge strip core is oriented in a self-centering manner, in particular centrally, relative to the material strip. This ensures that the edge strip core is arranged and fed in centrally on the material strip and is sewn to the material strip. As a result, the free ends of the casing are of approximately identical length.

The method according to the invention is distinguished by a freedom from tolerances. Further optimization operations and/or orientation operations are not required on account of the above-described, in particular self-centering feeding of the edge strip core and the material strip with respect to one another. Here, the feed of the edge strip core and the material strip can take place independently of one another on account of the self-centering feed unit.

The apparatus according to the invention for producing the above-described edge strip comprises a feed unit for feeding an edge strip core and an unfolded material strip of the casing for the edge strip core into a further processing unit, in particular a sewing machine, the feed unit being set up to feed the edge strip core to the further processing unit, in particular a sewing machine, on a surface side of the material strip, which surface side forms the inner side of the casing, and the sewing machine sewing the edge strip core to the material strip.

Here, the feed unit can be an integral part of a sewing machine base, or can be configured as a separate unit which can be placed on the sewing machine base, in particular can be fastened to the latter. The feed unit is arranged, in particular, on the feed side of the sewing machine base. Here, the feed unit serves to feed the edge strip core and the unfolded casing material in a self-centering manner, in order to sew them in the sewing machine.

In addition, an adapter is provided which can be an integral part of a sewing machine base and/or the feed unit, or can be placed onto the sewing machine base or onto the feed unit, in particular can be fastened thereto. The adapter is configured, in particular, as a folding unit which folds the unfolded material strip with the sewn edge strip core, and feeds it again to the sewing machine or to another sewing machine, in particular the sewing machine base, with the result that the free ends of the material strip which form the edge strip tab are sewn to one another by means of the needle.

A seat cover according to the invention for a seat comprises a plurality of cover parts, at least one edge strip according to the invention being provided in the region of at least two cover parts which are connected to one another.

By means of the introduction of the edge strip, a visually pleasing, in particular smooth or fold-free, seat cover is made possible which is produced in a simple way.

Here, an individual seat can be produced by way of the selection of a defined seat cover, in particular its material and/or edge strip. As a result, in particular, seats with different decorations or a seat with different properties with seat heating and/or seat ventilation and/or spatial climate control zones can be produced.

BRIEF DESCRIPTION OF THE DRAWINGS

Exemplary embodiments of the invention will be described in greater detail on the basis of drawings, in which.

Parts which correspond to one another are provided with the same designations in all the figures.

DETAILED DESCRIPTION

Figure 1A:
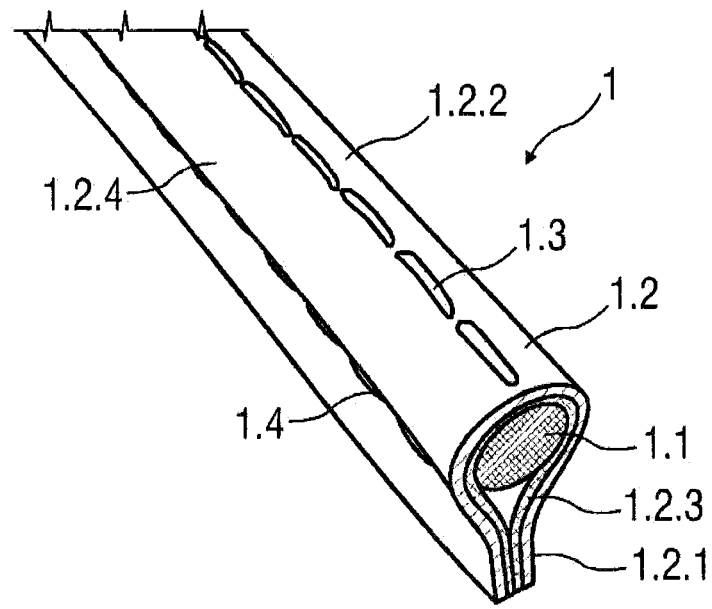
FIG. 1A diagrammatically shows a perspective illustration of an edge strip.

FIG. 1A diagrammatically shows a perspective illustration of one exemplary embodiment for an edge strip 1.

Edge strips 1 are used in the automotive field. The edge strip 1 serves generally to cover, for example, visible joins between two parts, such as between two seat cover parts or parts of a trim part. The edge strip 1 is also used in the transition region of parts, in order, for example, to make a fluent transition possible without the disruptive appearance of joins.

By means of the edge strip 1, the esthetic visual appearance of a component is improved, such as that of a seat or seat cover.

The edge strip 1 comprises an edge strip core 1.1 and a casing 1.2 which surrounds the latter, in particular a cover material.

The casing 1.2 surrounds the edge strip core 1.1 in a largely complete manner. Free ends of the casing 1.2 project in the form of an edge strip tab 1.2.1.

The edge strip core 1.1 and the casing 1.2 are sewn to one another in such a way that a decorative seam 1.3 is formed on the outer circumference 1.2.2 of the casing 1.2.

In the exemplary embodiment which is shown, the casing 1.2 encases or wraps around the edge strip core 1.1. The free ends of the casing 1.2 project from the wrapped-around edge strip core 1.1 in the form of the edge strip tab 1.2.1.

The edge strip core 1.1 (also called a bead, kernel or core) is enclosed or surrounded by the casing 1.2 in other words.

The free ends of the edge strip tab 1.2.1 are sewn to one another by means of a seam 1.4. In other words: the casing 1.2 encases the edge strip core 1.1, and is connected, in particular is sewn centrally, to the edge strip core 1.1 by means of the decorative seam 1.3, the free ends of the casing material being additionally sewn with the configuration of the edge strip tab 1.2.1. As a result, the edge strip core 1.1 is arranged and held within the casing 1.2. The edge strip 1 is sewn, for example, between two cover parts to be connected for a seat cover or headrest cover.

The edge strip core 1.1 and the casing 1.2 are manufactured separately, in particular are prefabricated.

The edge strip core 1.1 is formed, for example, from an elastic material, for example from plastic or rubber. The casing 1.2 and the edge strip tabs 1.2.1 are configured in one piece. In particular, the casing 1.2 and the edge strip tabs 1.2.1 are formed from a material strip, for example a cover material, in particular from a plastic material or a natural material, such as from polypropylene, synthetic or real leather, or another textile or woven fabric.

The casing 1.2 can optionally be provided with a lining 1.2.3 on its inner side 1.2.5.

Here, the edge strip core 1.1 can lie loosely in the casing 1.2. In order to fix the edge strip core 1.1 on the casing 1.2, said edge strip core 1.1 is sewn by means of the decorative seam 1.3 to the casing 1.2 along the longitudinal extent of the latter.

Figure 1B:
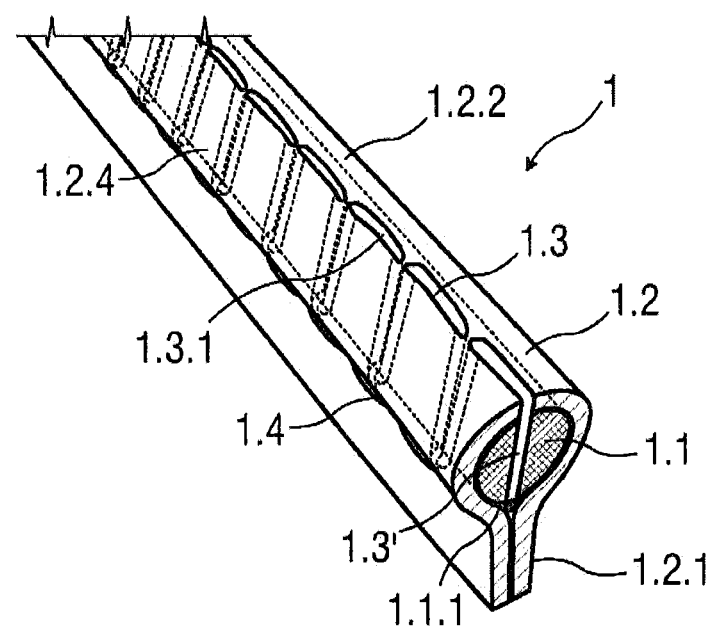
FIG. 1B diagrammatically shows a perspective illustration of a further embodiment of an edge strip, FIG. 2 diagrammatically shows a plan view of an inner side of a material strip of a casing with a sewn edge strip core, FIG. 3A diagrammatically shows a plan view of an outer side of a material strip of a casing with a decorative seam, FIG. 3B diagrammatically shows a plan view of an outer side of a material strip of a casing with a decorative seam, FIG. 3C diagrammatically shows a plan view of an outer side of a material strip of a casing with a decorative seam, FIG. 3D diagrammatically shows a plan view of an outer side of a material strip of a casing with a decorative seam, FIG. 4 diagrammatically shows a perspective view of a feed unit for feeding a material strip and an edge strip core for a further processing unit, such as a sewing machine, FIG. 5 diagrammatically shows a perspective view from below of the feed unit according to FIG. 4, FIG. 6 diagrammatically shows a perspective view of a feed unit with an introduced material strip and edge strip core, FIG. 7 diagrammatically shows a perspective view of a sewing machine with a feed unit on an inlet or feed side of the sewing machine, and with an introduced material strip and edge strip core, FIG. 8A diagrammatically shows a view of one exemplary embodiment for an adapter, in particular a folding unit, FIG. 8B diagrammatically shows a view of one exemplary embodiment for an adapter, in particular a folding unit, FIG. 8C diagrammatically shows a view of one exemplary embodiment for an adapter, in particular a folding unit, FIG. 8D diagrammatically shows a view of one exemplary embodiment for an adapter, in particular a folding unit, FIG. 9A diagrammatically shows a view of a further embodiment for an adapter, in particular a folding unit, FIG. 9B diagrammatically shows a view of a further embodiment for an adapter, in particular a folding unit, FIG. 9C diagrammatically shows a view of a further embodiment for an adapter, in particular a folding unit, FIG. 9D diagrammatically shows a view of a further embodiment for an adapter, in particular a folding unit, FIG. 9E diagrammatically shows a view of a further embodiment for an adapter, in particular a folding unit, FIG. 10 diagrammatically shows an enlarged illustration of one exemplary embodiment for a sewing machine base for a sewing machine, and FIG. 11 diagrammatically shows an enlarged illustration of one exemplary embodiment for a sewing machine base for a sewing machine with an introduced material strip and edge strip core.

FIG. 1B diagrammatically shows a further embodiment of the edge strip 1, comprising the edge strip core 1.1 and the casing 1.2 which surrounds the edge strip core 1.1, without a lining.

The casing 1.2 surrounds the edge strip core 1.1 completely. The free ends of the casing 1.2 project in the form of an edge strip tab 1.2.1.

The edge strip core 1.1 and the casing 1.2 are sewn to one another in such a way that the decorative seam 1.3 is formed on the outer circumference 1.2.2 of the casing 1.2. For example, the decorative seam 1.3 is formed by means of a thread 1.3'. The thread 1.3' is guided in sections completely through the casing 1.2 and the edge strip core 1.1 in order to sew the casing 1.2 and the edge strip core 1.1. In other words: the thread 1.3' is guided in sections in the longitudinal extent of the edge strip 1 through the outer side 1.2.4 of the casing 1.2 as far as an edge strip core underside 1.1.1 which is not visible and is enclosed by the free ends of the casing 1.2. In particular, the thread 1.3' extends in sections over the overall diameter of the edge strip core 1.1. The thread 1.3' forms the visible decorative seam 1.3 on the outer circumference 1.2.2 or on the outer side 1.2.4 of the casing 1.2. In particular, the thread 1.3' which forms the decorative seam 1.3 comprises visible decorative seam sections 1.3.1 which are spaced apart from one another in a substantially homogeneous manner. The visible decorative seam sections 1.3.1 can be of any desired configuration. A pattern of the visible decorative seam sections 1.3.1 can be set individually in order to improve a visual appearance of the edge strip 1. Different stitching types can be used.

Figure 2:
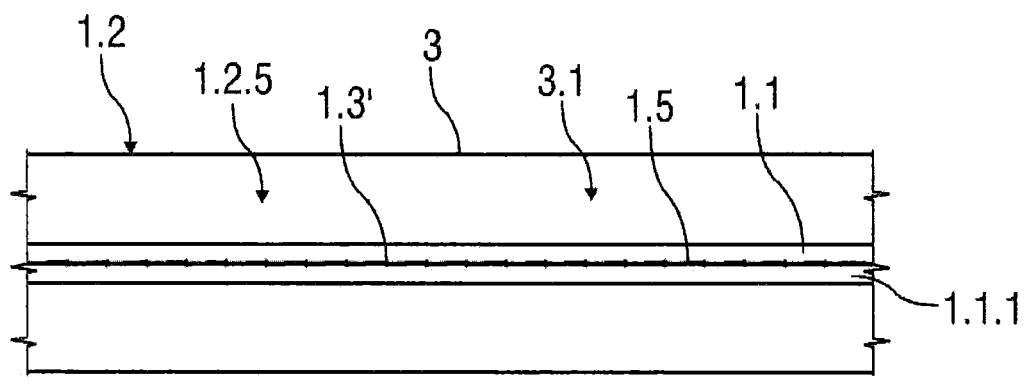
Figure 3A:
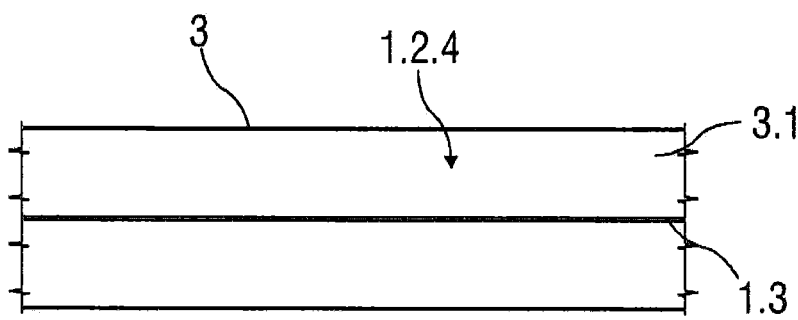
Figure 3B:
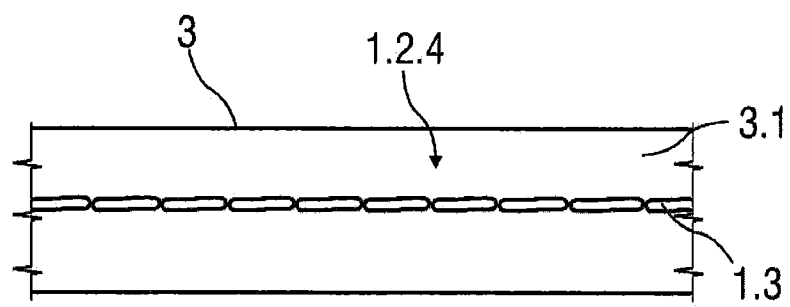
Figure 3C:
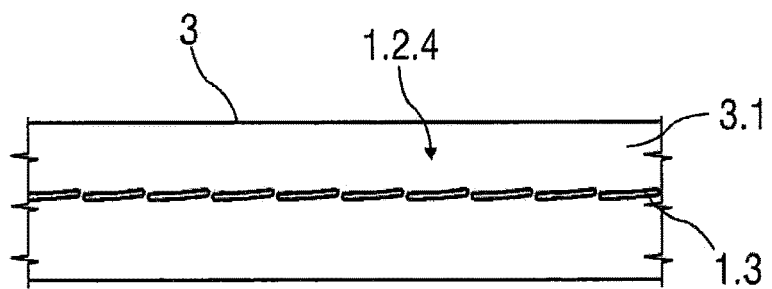
Figure 3D:
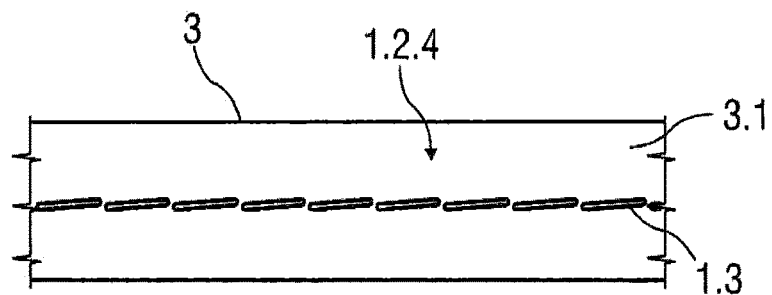

FIG. 2 diagrammatically shows a plan view of a surface side 3.1 of a material strip 3 for the casing 1.2 with a sewn edge strip core 1.1. Here, the decorative seam 1.3 passes through the casing 1.2, in particular the material strip 3, and the edge strip core 1.1. FIG. 1 shows that part of the decorative seam 1.3 which is visible on the outer side 1.2.4 of the casing 1.2. FIG. 2 shows that part of the decorative seam 1.3 on an inner side 1.2.5 of the casing 1.2, which part is arranged on the edge strip core 1.1 and is not visible in the state in which it is being used. As shown in FIG. 2, the thread 1.3' which forms the decorative seam 1.3 is guided completely through the edge strip core 1.1. On the edge strip core underside 1.1.1 which is not visible and is enclosed by the casing 1.2, the thread 1.3' in each case forms a loop for fastening to a lower thread 1.5 in a state in which it is guided through the edge strip core 1.1.

The edge strip core 1.1 is formed, for example, from a shaped part, in particular a plastic, foam or rubber cord. The casing 1.2 is formed, for example, from a cover material, in particular from plastic, leather or a woven fabric. The cover material is provided, in particular, as a material strip 3.

In accordance with a further embodiment, the decorative seam 1.3 extends centrally along the longitudinal extent of the edge strip 1 on the visible outer side of the latter, as shown in FIG. 1. As a result, the edge strip 1 is enhanced visually and decorated.

FIGS. 3A to 3D in each case diagrammatically show a plan view of a surface side 3.2 of the material strip 3, which surface side 1.2 forms a visible outer side 1.2.4 for the casing 1.2 with the various exemplary embodiments for the decorative seam 1.3 which is visible to the outside and is, in particular, central. The decorative seam 1.3 can be, for example, configured to be thick, thin, with stitches which are spaced apart to a lesser or greater extent from one another and/or run obliquely or are straight, or in another suitable design form.

Figure 4:
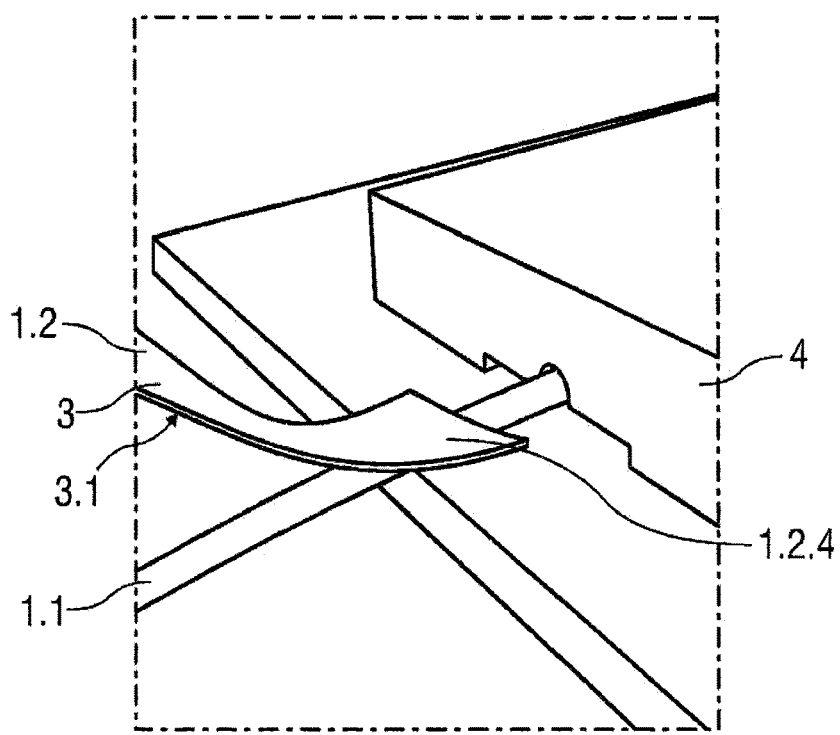
Figure 7:
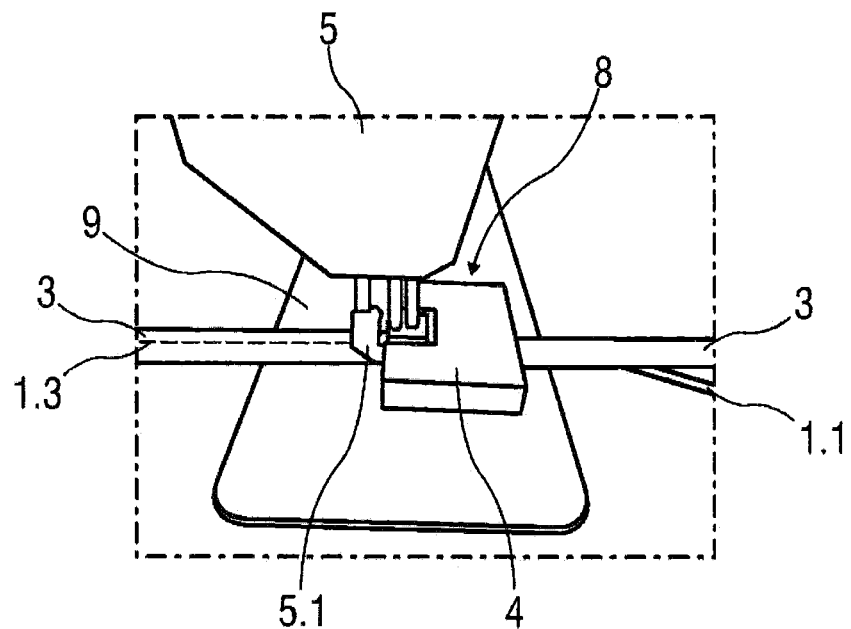
Figure 8A:
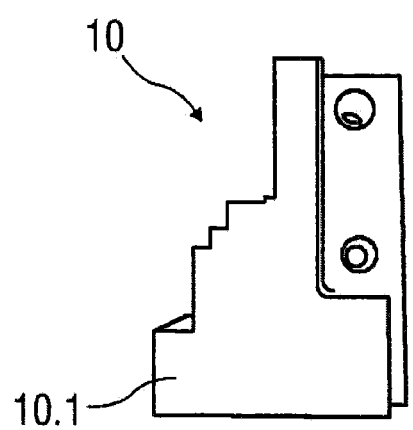
Figure 8B:
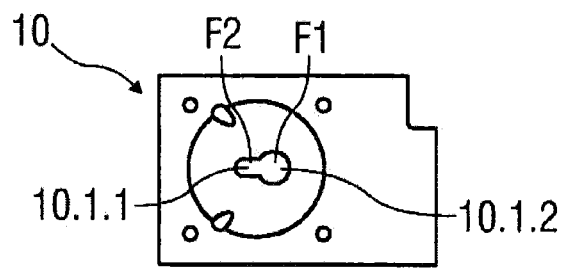
Figure 8C:
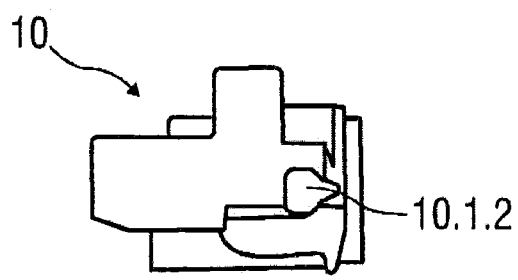
Figure 8D:
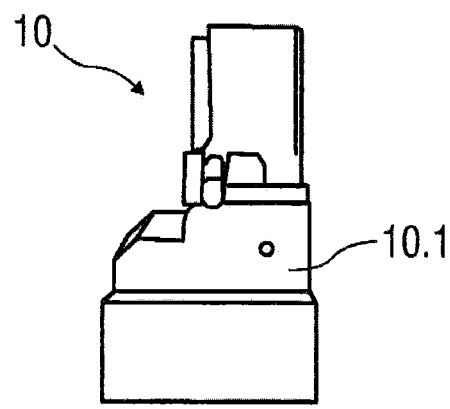
Figure 9A:
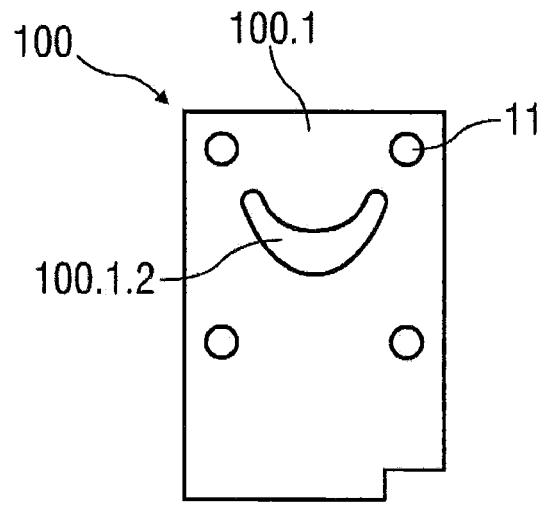
Figure 9B:
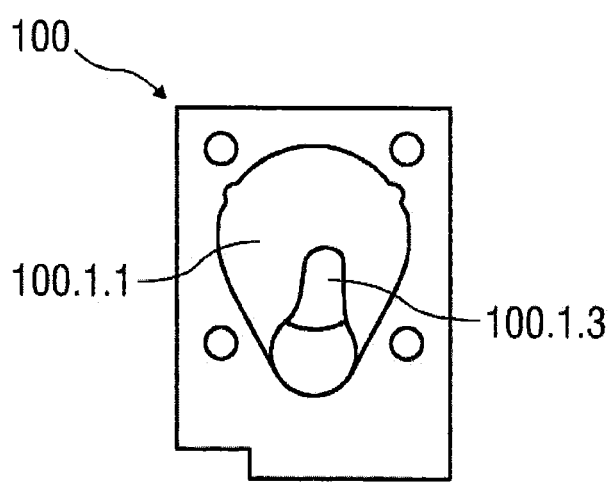
Figure 9C:
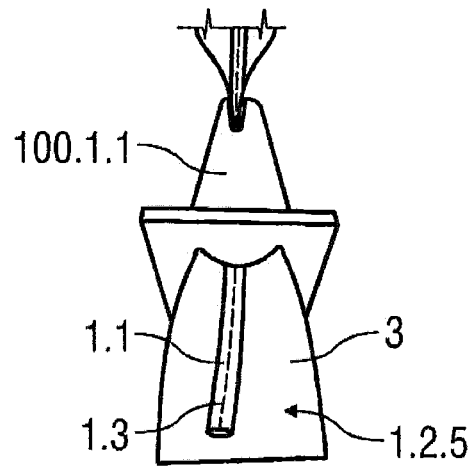
Figure 9D:
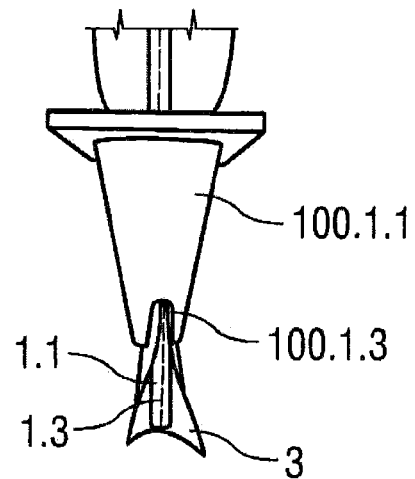
Figure 9E:
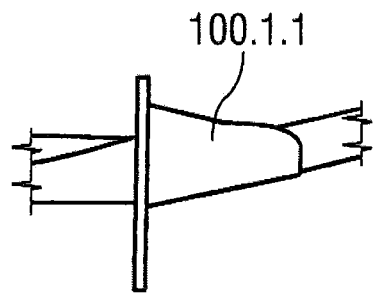

FIG. 4 diagrammatically shows a perspective view of a feed unit 4 for feeding the material strip 3 and the edge strip core 1.1 independently of one another for a following processing unit, such as a sewing machine 5 which is shown, for example, in FIG. 7. In the following text, the invention will be described in greater detail on the basis of the processing in the sewing machine 5.

Here, in order to produce the edge strip 1, the edge strip core 1.1 and the unfolded material strip 3 for the casing 1.2 of the edge strip core 1.1 are guided into the feed unit 4 in such a way that the edge strip core 1.1 is fed to the sewing machine 5 on the surface side 3.1 of the material strip 3, which surface side 3.1 forms the inner side 1.2.5 of the casing 1.2, which sewing machine 5 then sews the edge strip core 1.1 to the material strip 3 by means of the decorative seam 1.3 (as shown in FIG. 7). Therefore, the edge strip core 1.1 is connected fixedly to the casing 1.2 on the inner side 1.2.5 of the latter by means of the decorative seam 1.3 which passes both through the edge strip core 1.1 and through the casing 1.2, with the result that the decorative seam 1.3 forms a visual decoration or design element on the outer side of the casing 1.2.

Figure 5:
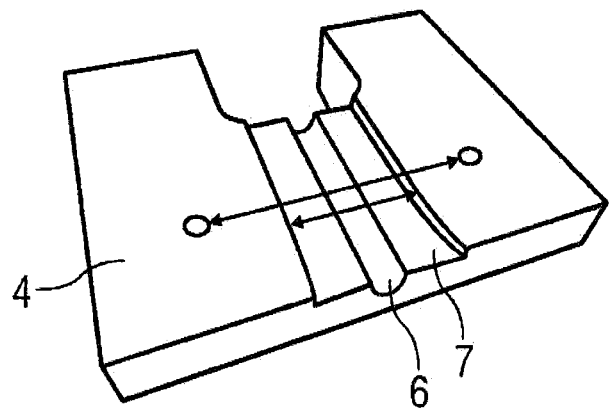

FIG. 5 diagrammatically shows a view from below of the feed unit 4 which is configured as a profiled component. The feed unit 4 has a central groove 6 which is made in a centered manner in a depression 7 of a solid component. As a result of a stepped construction of this type of a narrow groove 6 and a wide depression 7 which adjoins the former, the edge strip core 1.1 and the casing 1.2 are fed to the sewing machine 5 independently from one another, but in a manner which is oriented relative to one another.

Figure 6:
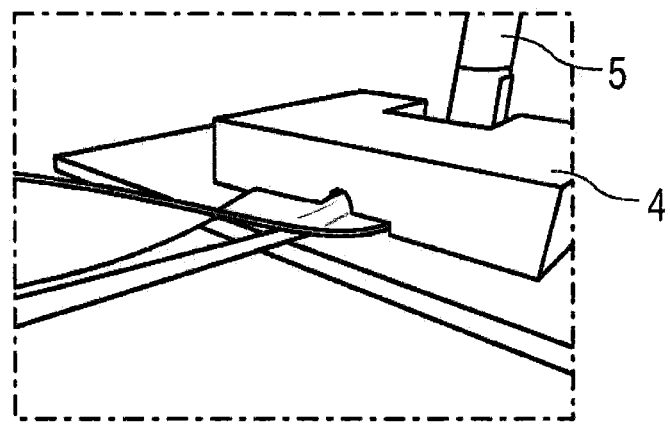

FIG. 6 diagrammatically shows a perspective view of the feed unit 4 with an introduced material strip 3 and edge strip core 1.1. The feed unit 4 is of self-centering configuration. To this end, said feed unit 4 has the above-described stepped arrangement of groove 6 and depression 7. Here, the feed unit 4 orients the edge strip core 1.1 relative to the material strip 3 in a self-centering, in particular central, manner.

FIG. 7 diagrammatically shows a perspective view of the sewing machine 5 with the feed unit 4 on an inlet or feed side 8 of the sewing machine 5 in the region of a sewing machine base 5.1. Here, the material strip 3 is fed to the feed unit 4 in an unfolded manner, and the edge strip core 1.1 is fed separately from said material strip 3. On the outlet side 9, the edge strip core 1.1 is sewn to the material strip 3 by means of the decorative seam 1.3.

In one development of the method, the material strip 3 which is sewn to the edge strip core 1.1 is folded. To this end, the sewing machine 5 can be provided, instead of the feed unit 4, with an adapter 10 (not shown in greater detail), or a further sewing machine can be provided with the adapter 10 (not shown in greater detail).

FIGS. 8A to 8D diagrammatically show various views of one exemplary embodiment of the adapter 10. The adapter 10 is configured, in particular, as a folding unit 10.1.

The folding unit 10.1 is set up to fold the material strip 3 which is sewn to the edge strip core 1.1, in particular to fold it in such a way that the material strip 3 encases the edge strip core 1.1, and free ends of the material strip 3 which project from the edge strip core 1.1 form the edge strip tab 1.2.1 and are arranged above one another. Subsequently, the free ends which lie above one another are sewn to one another using the seam 1.4 by means of a further sewing machine or the sewing machine 5.

To this end, on the guide inlet side, the folding unit 10.1 comprises a funnel 10.1.1. Here, at the narrow end, the funnel 10.1.1 has an opening 10.1.2, the contour of which corresponds at least partially to the outer shape F1 of the edge strip core 1.1 and the outer shape F2 of the edge strip tabs 1.2.1. As a result of the funnel shape, during the feeding operation, the material strip 3 which is fed in is folded centrally around the edge strip core 1.1 which is likewise fed in, the free ends being guided out of the folding unit 10.1 as an edge strip tab 1.2.1 in the slot-shaped part of the opening 10.1.2, and being fed to the needle of the sewing machine 5 which sews the free ends of the edge strip tab 1.2.1 to one another.

The method according to the invention is distinguished by a freedom from tolerances. Further optimization operations and/or orientation operations are not required on account of the above-described, in particular self-centering feed of the edge strip core 1.1 and the material strip 3 with respect to one another.

FIGS. 9A to 9E show various views of one alternative embodiment for an adapter 100, in particular a folding unit 100.1. On the outlet side, the folding unit 100.1 has a funnel 100.1.1 and, on the inlet side, an arcuate or crescent-shaped opening 100.1.2. Here, the arcuate shape of the opening 100.1.2 corresponds substantially to the semicircle of the large funnel opening of the funnel 100.1.1. As a result, the material strip 3 is folded at least partially around the edge strip core 1.1 which is likewise fed in, and is guided in the direction of the small opening of the funnel 100.1.1. The small opening of the funnel 100.1.1 has a slot 100.1.3 in the direction of the large opening, in which the free ends of the edge strip tab 1.2.1 are guided out of the folding unit 100.1 such that they lie above one another on account of the fold of the material strip 3. Subsequently, the free ends of the edge strip tab 1.2.1 are sewn to one another.

Figure 10:
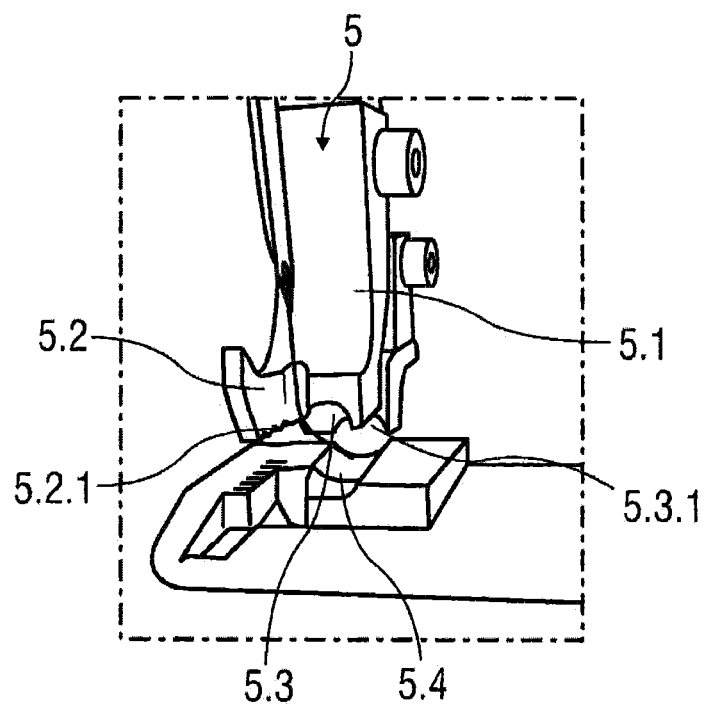

FIG. 10 diagrammatically shows an enlarged illustration of one exemplary embodiment for a sewing machine base 5.1 of the sewing machine 5. The sewing machine base 5.1 is set up to guide the material strip 3 which is folded around the edge strip core 1.1, and to sew the free ends thereof which form the edge strip tab 1.2.1 to one another. To this end, the sewing machine base 5.1 has a modified slide 5.2 which has only one runner 5.2.1.

On the side of the runner which is dispensed with, the sewing machine base 5.1 has a slot 5.3 which has an inner curvature 5.3.1 which is of corresponding configuration with respect to the contour of the edge strip core 1.1. A stationary base part likewise has an inner curvature 5.4 which is likewise of corresponding configuration with respect to the contour of the edge strip core 1.1.

Figure 11:
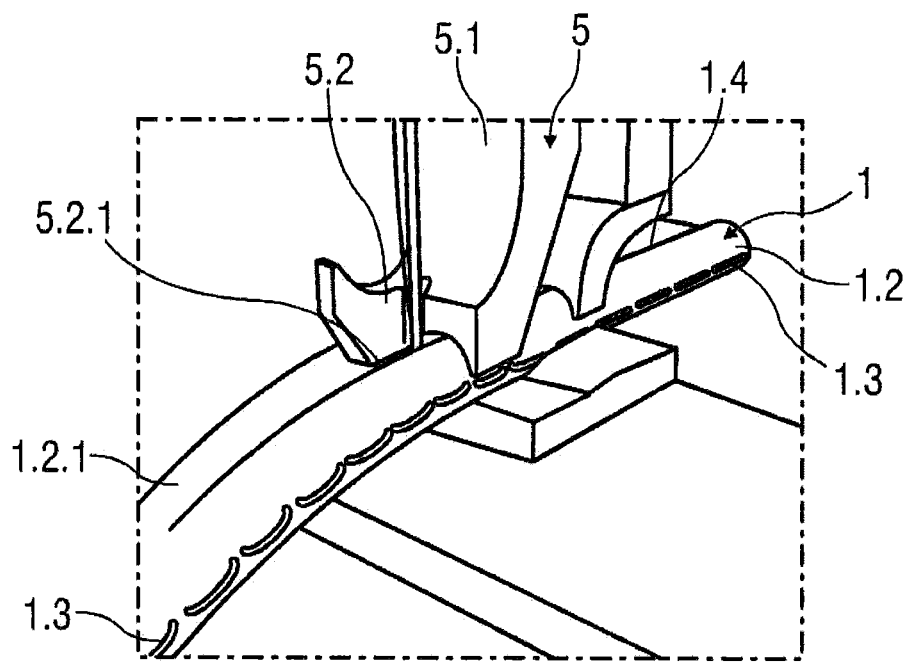

FIG. 11 diagrammatically shows an enlarged illustration of one exemplary embodiment for the sewing machine base 5.1 of the sewing machine 5 with a material strip 3 which is introduced and is folded around the edge strip core 1.1, for the introduction of the seam 1.4 into the free ends of the edge strip tab 1.2.1.

In summary, the above-described apparatus for producing the above-described edge strip 1 comprises the feed unit 4 for feeding the edge strip core 1.1 and an unfolded material strip 3 for the casing 1.2 of the edge strip core 1.1 in the sewing machine 5, the feed unit 4 being set up to feed the edge strip core 1.1 to the sewing machine 5 on a surface side 3.1 of the material strip 3, which surface side 3.1 forms the inner side 1.2.5 of the casing 1.2, and the sewing machine 5 sewing the edge strip core 1.1 to the material strip 3. Subsequently, the material strip 3 which is sewn to the edge strip core 1.1 is folded, and its free ends which form the edge strip tab 1.2.1 are sewn to one another by means of the further seam 1.4.

Here, the feed unit 4 can be an integral part of a sewing machine base 5.1, or can be configured as a separate unit which can be placed on the sewing machine base, in particular can be fastened to the latter. The feed unit 4 is arranged, in particular, on the sewing machine base on its feed side. Here, the feed unit 4 serves to feed the edge strip core 1.1 and unfolded casing material in a self-centering manner in order to sew them in the sewing machine 5.

By means of the introduction of the edge strip 1.1, a visually appealing, in particular smooth or fold-free, seat cover is made possible which is produced in a simple way.

LIST OF DESIGNATIONS

1 Edge strip
1.1 Edge strip core
1.1.1 Edge strip core underside
1.2 Casing
1.2.1 Edge strip tab
1.2.2 Outer circumference
1.2.3 Lining
1.2.4 Outer side
1.2.5 Inner side
1.3 Decorative seam
1.3' Thread
1.3.1 Decorative seam sections
1.4 Seam
1.5 Lower thread
3 Material strip
3.1, 3.2 Surface side
4 Feed unit
5 Sewing machine
5.1 Sewing machine base
5.2 Slide
5.2.1 Runner
5.3 Slot
5.3.1 Inner curvature
5.4 Inner curvature
6 Groove 7 Depression
8 Inlet or feed side
9 Outlet side
10, 100 Adapter
10.1, 100.1 Folding unit
10.1.1 Funnel
10.1.2, 100.1.2 Opening
100.1.3 Slot
F1, F2 External shape

The invention claimed is:

1. An apparatus for producing an edge strip, comprising:
a feed unit for feeding an edge strip core and an unfolded material strip of a casing for the edge strip core into a further processing unit, including a sewing machine, the feed unit being set up to feed the edge strip core to the further processing unit, including a sewing machine, on a surface side of the material strip, which surface side forms the inner side of the casing, and to orient it, including, in a self-centering manner, and the sewing machine sewing the edge strip core to the material strip,
wherein the feed unit has a central groove and a depression, the central groove centered in the depression,
wherein the edge strip core is fed by the central groove and the casing is fed by the depression.

\* \* \* \* \*